(12) United States Patent
Kageyama et al.

(10) Patent No.: US 9,553,469 B2
(45) Date of Patent: Jan. 24, 2017

(54) METHOD OF OVERCURRENT DETECTION VOLTAGE CORRECTION AND BATTERY PROTECTION INTEGRATED CIRCUIT

(71) Applicants: Ryota Kageyama, Tokyo (JP);
Tsutomu Yamauchi, Tokyo (JP);
Norihito Kawaguchi, Tokyo (JP);
Nobuhito Tanaka, Tokyo (JP); Takashi Takeda, Tokyo (JP); Yoshihiro Satake, Tokyo (JP); Takeshi Yamaguchi, Tokyo (JP); Koji Koshimizu, Tokyo (JP)

(72) Inventors: Ryota Kageyama, Tokyo (JP);
Tsutomu Yamauchi, Tokyo (JP);
Norihito Kawaguchi, Tokyo (JP);
Nobuhito Tanaka, Tokyo (JP); Takashi Takeda, Tokyo (JP); Yoshihiro Satake, Tokyo (JP); Takeshi Yamaguchi, Tokyo (JP); Koji Koshimizu, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/865,167

(22) Filed: Sep. 25, 2015

(65) Prior Publication Data
US 2016/0372954 A1 Dec. 22, 2016

(30) Foreign Application Priority Data

Jun. 18, 2015 (JP) .................................. 2015-123267

(51) Int. Cl.
*H02J 7/00* (2006.01)

(52) U.S. Cl.
CPC ............ *H02J 7/0083* (2013.01); *H02J 7/0029* (2013.01); *H02J 7/0078* (2013.01); *H02J 2007/0039* (2013.01)

(58) Field of Classification Search
USPC ......................................................... 320/134
See application file for complete search history.

(56) References Cited

U.S. PATENT DOCUMENTS

| 8,283,895 B2 * | 10/2012 | Lee ....................... H02J 7/0016 |
| | | 320/134 |
| 2008/0224664 A1 * | 9/2008 | Sano ..................... H02J 7/0031 |
| | | 320/134 |

FOREIGN PATENT DOCUMENTS

| JP | H06-209519 | 7/1994 |
| JP | 2011-239652 | 11/2011 |
| JP | 5205368 | 6/2013 |

OTHER PUBLICATIONS

Machine Translation of JP06-209519.*
Japanese Office Action mailed Nov. 4, 2015.

* cited by examiner

*Primary Examiner* — Samuel Berhanu
(74) *Attorney, Agent, or Firm* — IPUSA, PLLC

(57) ABSTRACT

There is provided a method of correcting an overcurrent detection voltage of a battery protection integrated circuit including a current path between a first terminal and a second terminal, one or more transistors for controlling current of a secondary battery, an overcurrent detection circuit and a control circuit. The method comprises the steps of: measuring a resistance value between the first terminal and the second terminal wherein the one or more transistors are turned on at a predetermined temperature; estimating resistance values between the first terminal and the second terminal at respective temperatures based on the measured resistance value; calculating adjusting data for canceling temperature dependency of charge or discharge current of the secondary battery based on the measured resistance value and the estimated resistance values, wherein a value of (Continued)

the charge or discharge current varies depending on temperature; correcting the overcurrent detection voltage based on the calculated adjusting data.

9 Claims, 8 Drawing Sheets

FIG.6

| T | Ron(T) |
|---|---|
| T0 | Ron(T0) |
| T1 | Ron(T1) |
| T2 | Ron(T2) |
| T3 | Ron(T3) |
| ⋮ | ⋮ |
| TN | Ron(TN) |

FIG.7

| $\Delta$ Ron(T) | |
|---|---|
| $\Delta$ Ron(T0) | 0 |
| $\Delta$ Ron(T1) | Ron(T1)−Ron(T0) |
| $\Delta$ Ron(T2) | Ron(T2)−Ron(T0) |
| $\Delta$ Ron(T3) | Ron(T3)−Ron(T0) |
| ⋮ | ⋮ |
| $\Delta$ Ron(TN) | Ron(TN)−Ron(T0) |

FIG.12

| VGS | Ron(VGS) |
|---|---|
| Vgs0 | Ron(Vgs0) |
| Vgs1 | Ron(Vgs1) |
| Vgs2 | Ron(Vgs2) |
| Vgs3 | Ron(Vgs3) |
| ⋮ | ⋮ |
| VgsN | Ron(VgsN) |

FIG.13

| ΔRon(VGS) | |
|---|---|
| ΔRon(Vgs1) | Ron(Vgs1)−Ron(Vgs0) |
| ΔRon(Vgs2) | Ron(Vgs2)−Ron(Vgs0) |
| ΔRon(Vgs3) | Ron(Vgs3)−Ron(Vgs0) |
| ⋮ | ⋮ |
| ΔRon(VgsN) | Ron(VgsN)−Ron(Vgs0) |

METHOD OF OVERCURRENT DETECTION VOLTAGE CORRECTION AND BATTERY PROTECTION INTEGRATED CIRCUIT

CROSS-REFERENCE TO RELATED APPLICATIONS

This patent application is based upon and claims the benefit of priority of Japanese Patent Application No. 2015-123267, filed on Jun. 18, 2015, the entire contents of which are incorporated herein by reference.

BACKGROUND OF THE INVENTION

1. Field of the Invention

The present disclosure relates to a method of overcurrent detection voltage correction and a battery protection integrated circuit.

2. Description of the Related Art

Conventionally, a battery protection integrated circuit is known, which includes a transistor connected between a negative electrode terminal of a secondary battery and a negative electrode terminal of a battery charger and a control chip for controlling charge/discharge of the secondary battery by turning on and off the transistor (for example, see Patent Document 1).

Meanwhile, an overcurrent detection circuit is known, which monitors a magnitude relation of a voltage between a negative electrode terminal of a secondary battery and a negative electrode terminal of a load and an overcurrent detection voltage set for detecting the overcurrent of the secondary battery, thereby detecting the overcurrent (for example, see Patent Document 2). The overcurrent detection circuit detects the overcurrent by using a voltage variance in accordance with a voltage reduction due to an on-resistance of the transistor connected between the terminals.

However, a value of the on-resistance of the transistor is likely to vary due to manufacturing irregularity, temperature variance, variance of the gate voltage of the transistor, etc. Therefore, when overcurrent detection voltages of the respective battery protection circuit are set to be the same voltage value, current values (overcurrent detection value) of the detected overcurrent are varied according to the respective battery protection integrated circuits.

FIG. 1 is a diagram for illustrating an example variation of the overcurrent detection values due to the temperature variance in three samples of the battery protection integrated circuit A, B and C. The on-resistance (hereinafter, referred to as "Rsson") of the transistor is likely to vary due to the manufacturing irregularity of the samples A, B and C, or the temperature variance. Therefore, in a case where the overcurrent detection voltages Viover of the samples A, B and C are set to be the same voltage value within a certain temperature range including a reference temperature T0, the overcurrent detection values Iover are varied according to the samples A, B and C.

FIG. 2 is a diagram for illustrating an example variation of the overcurrent detection values due to gate voltage variance in the three battery protection integrated circuit samples of A, B and C. Rsson is likely to vary due to the manufacturing irregularity of the samples A, B and C or the variance of the gate voltage VGS. Therefore, in a case where the overcurrent detection voltages Viover of the samples A, B and C are set to be the same voltage value within a certain gate voltage range including a reference gate voltage value Vgs0, the overcurrent detection values Iover are varied according to the samples A, B and C.

RELATED ART DOCUMENT

Patent Document

[Patent Document 1]: Japanese Patent Gazette No. 5205368
[Patent Document 2]: Japanese Laid-open Patent Publication No. 2011-239652

SUMMARY OF THE INVENTION

An object of disclosure of the present technology is to provide a charge overcurrent detection voltage correction method and a battery protection integrated circuit capable of suppressing variation of the overcurrent detection values among the respective battery protection circuits.

According to one embodiment of the present invention, there is provided a method of correcting an overcurrent detection voltage of a battery protection integrated circuit including a current path between a first terminal and a second terminal, one or more transistors connected in series in the current path for controlling current of a secondary battery, an overcurrent detection circuit configured to monitor a relation of magnitude between a current path voltage and an overcurrent detection voltage set for detecting overcurrent of the secondary battery, the current path voltage being a voltage between the first terminal and the second terminal during an on state of the one or more transistors, and a control circuit configured to turn off the one or more transistors upon the overcurrent detection circuit detecting that the relation of magnitude is inverted, the method comprising the steps of: measuring a resistance value between the first terminal and the second terminal while the one or more transistors are turned on at a predetermined temperature; estimating resistance values between the first terminal and the second terminal at respective temperatures based on the measured resistance value; calculating adjusting data for canceling temperature dependency of charge or discharge current of the secondary battery based on the measured resistance value and the estimated resistance values, wherein a value of the charge or discharge current varies depending on temperature; correcting the overcurrent detection voltage based on the calculated adjusting data.

According to another embodiment of the present invention, there is provided a method of correcting an overcurrent detection voltage of a battery protection integrated circuit including a current path between a first terminal and a second terminal, one or more transistors connected in series in the current path for controlling current of a secondary battery, an overcurrent detection circuit configured to monitor a relation of magnitude between a current path voltage and an overcurrent detection voltage set for detecting overcurrent of the secondary battery, the current path voltage being a voltage between the first terminal and the second terminal during an on state of the one or more transistors, and a control circuit configured to turn off the one or more transistors upon the overcurrent detection circuit detecting that the relation of magnitude is inverted, the method comprising the steps of: measuring a gate threshold voltage of the one or more transistors at a predetermined temperature and a resistance value between the first terminal and the second terminal while the one or more transistors are turned on at a predetermined gate voltage; estimating resistance values between the first terminal and the second terminal at respective gate voltages based on the measured gate threshold voltage; calculating adjusting data for canceling gate voltage dependency of charge or discharge current of the secondary battery based on the measured resistance value and the estimated resistance values, wherein a value of the charge or discharge current varies depending on a gate voltage of the one or more transistors; correcting the overcurrent detection voltage based on the calculated adjusting data.

According to another embodiment of the present invention, there is provided a battery protection integrated circuit comprising: a current path between a first terminal and a second terminal, one or more transistors connected in series in the current path for controlling current of a secondary battery, an overcurrent detection circuit configured to monitor a relation of magnitude between a current path voltage and an overcurrent detection voltage set for detecting overcurrent of the secondary battery, the current path voltage being a voltage between the first terminal and the second terminal during an on state of the one or more transistors, a control circuit configured to turn off the one or more transistors upon the overcurrent detection circuit detecting that the relation of magnitude is inverted, a nonvolatile memory in which adjusting data is written, the adjusting data being at least one of first data and second data, wherein the first data is data for correcting temperature dependency of an on-resistance of the one or more transistors or correcting gate voltage dependency of the on-resistance of the one or more transistors, the on-resistance of the one or more transistors varying depending on temperature and a gate voltage of the one or more transistors and the second data is data for correcting individual difference of the on-resistance of the one or more transistors, and an adjusting circuit configured to adjust the overcurrent detection voltage in accordance with the adjusting data retrieved from the memory.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 6 is a diagram for showing an example of Rsson at each temperature.

FIG. 7 is a diagram for showing an example of gradient data with respect to temperature variance of Rsson.

FIG. 12 is a diagram for showing an example of Rsson at each gate voltage.

FIG. 13 is a diagram for showing an example of gradient data with respect to VGS variance.

DETAILED DESCRIPTION OF THE PREFERRED EMBODIMENTS

In the following, embodiments will be described with reference to accompanied drawings.

Figure 1:
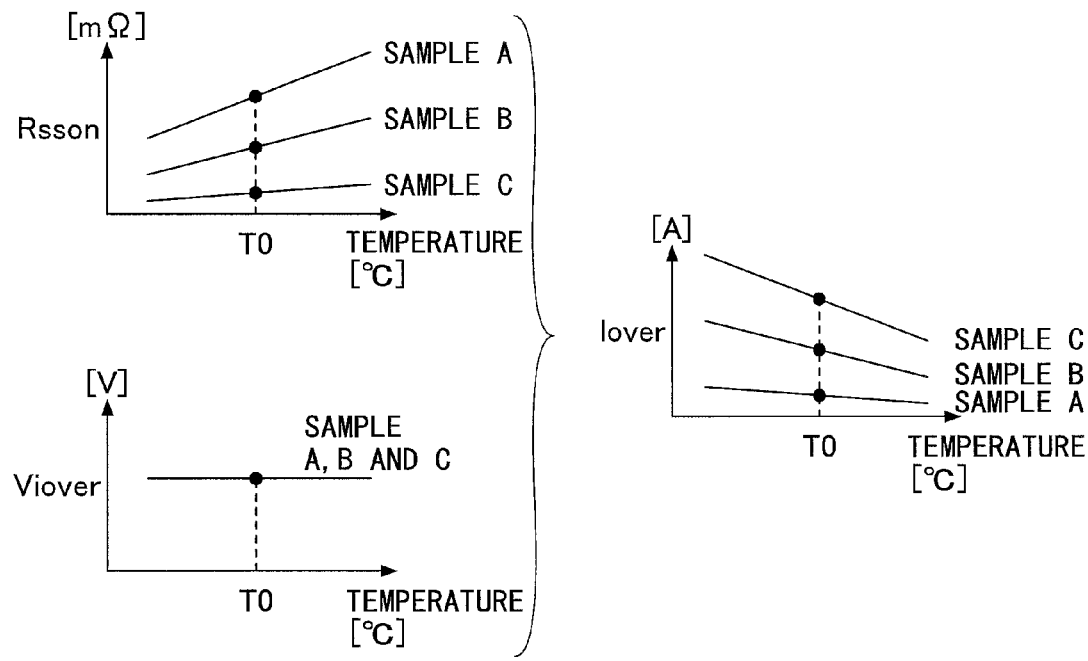
FIG. 1 is a diagram for illustrating an example variation of the overcurrent detection values due to temperature variance.
Figure 2:
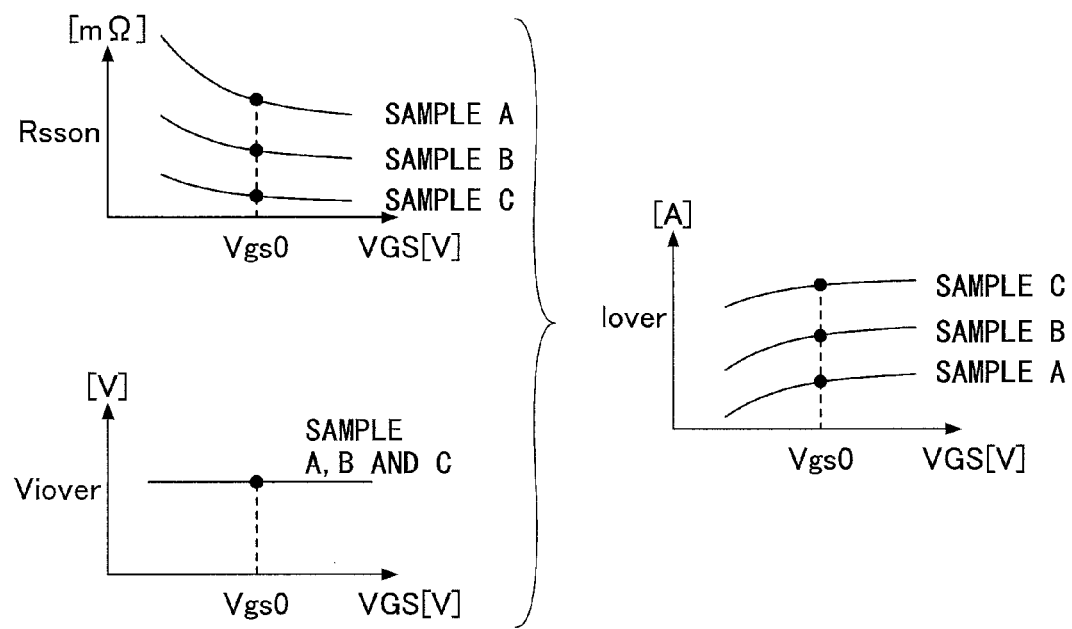
FIG. 2 is a diagram for illustrating an example variation of the overcurrent detection values due to gate voltage variance.
Figure 3:
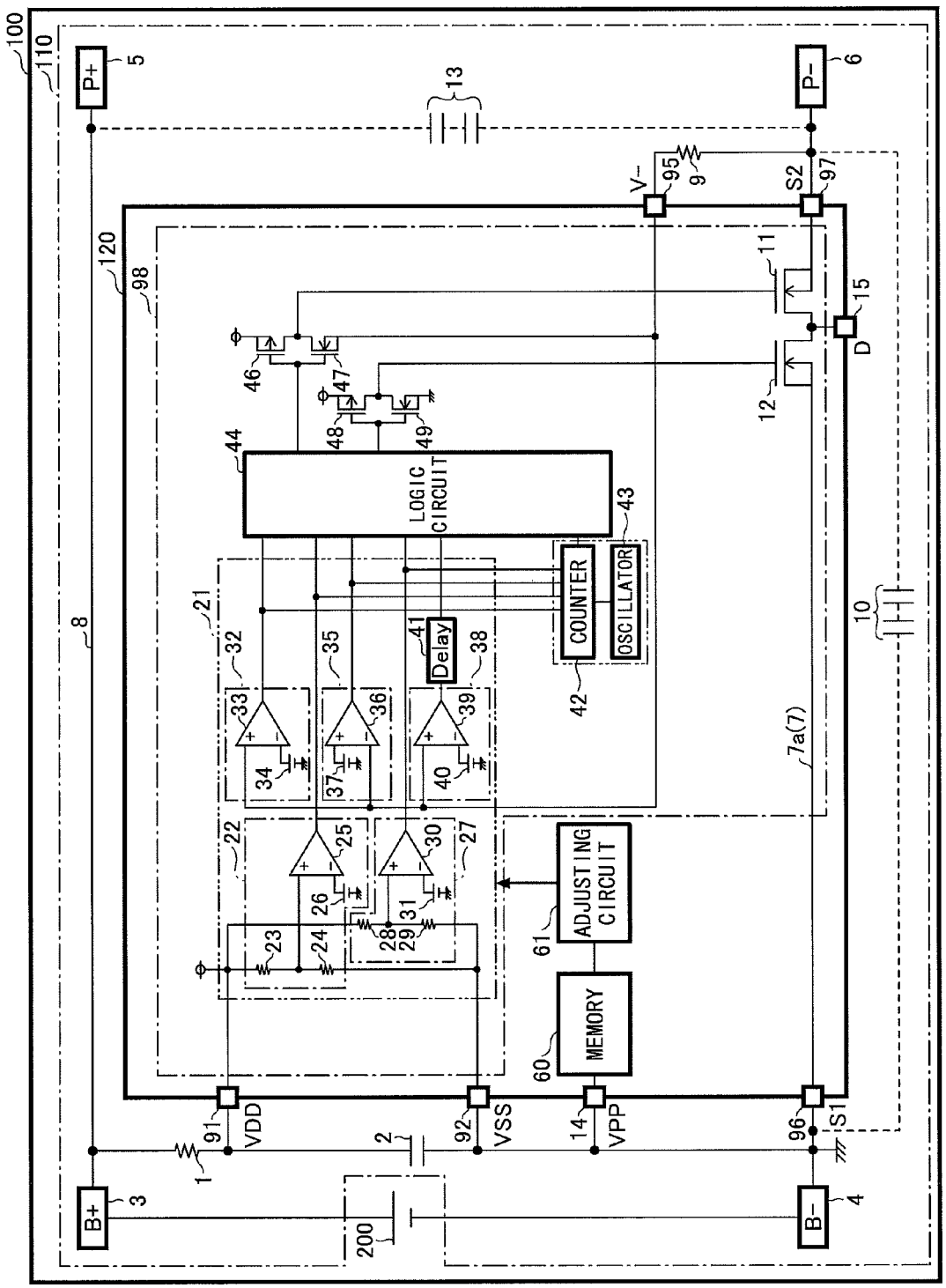
FIG. 3 is a diagram for illustrating an example configuration of a battery pack including a battery protection integrated circuit.

FIG. 3 is a diagram for illustrating an example configuration of a battery pack 100 including a battery protection integrated circuit 120. The battery pack 100 includes a secondary battery 200 capable of providing electric power to an external load (not shown) connected to the load connection terminals 5 and 6, and a battery protection device 110 for protecting the secondary battery 200. The battery pack 100 may be internally included in the external load or may be externally attached to the external load. For example, the external load is a mobile terminal device. Electronic apparatuses such as a mobile phone, a smart phone, a tablet computer, a game console, a TV, a music or movie player, or a camera are exemplified as the mobile terminal device.

The secondary battery 200 can be charged with a battery charger (not shown) connected to the load connection terminals 5 and 6. A lithium-ion battery, a lithium polymer battery, etc., are exemplified as the secondary battery 200.

The battery protection device 110 includes the load connection terminal 5, the load connection terminal 6, cell connection terminals 3 and 4, and it is an example of a battery protection device for protecting the secondary battery 200 connected to the cell connection terminals 3 and 4 from the overcurrent, etc. The cell connection terminal 3 is connected to the load connection terminal 5 through a power supply path 8. The cell connection terminal 4 is connected to the load connection terminal 6 through a power supply path 7. The cell connection terminal 3 is connected to a positive electrode of the secondary battery 200. The cell connection terminal 4 is connected to a negative electrode of the secondary battery 200.

The battery protection device 110 includes transistors 11 and 12. The transistor 11 is an example of a charge path shutoff unit capable of shutting off a charge path of the secondary battery 200, and the transistor 12 is an example of discharge path shutoff unit capable of shutting off a discharge path of the secondary battery 200. In the example shown in FIG. 3, the transistor 11 can shut off the power supply path 7 to stop charge current of the secondary battery 200 flowing through it, and the transistor 12 can shut off the power supply 7 to stop discharge current of the secondary battery 200 flowing through it. The transistor 11 and 12 are switching elements capable of switching conductive state/conduction cut-off state of the power supply path 7, and are connected in series with the power supply path 7.

For example, the transistor 11 and 12 are MOSFETs (Metal Oxide Semiconductor Field Effect Transistor). The transistor 11 is connected with the power supply path 7 so that a forward direction of a parasitic diode of the transistor 11 is coincident with a discharge direction of the secondary battery 200. The transistor 12 is connected with the power supply path 7 so that a forward direction of a parasitic diode of the transistor 12 is coincident with a charge direction of the secondary battery 200.

The battery protection device 110 may include capacitors 10 and 13. The capacitor 10 is connected in parallel with a circuit in which the transistor 11 and the transistor 12 are connected in series. The capacitor 13 includes one end connected to the load connection terminal 5 and the other end connected to the load connection terminal 6. Tolerance to a change in voltage or an external noise can be improved by disposing the capacitor 10 or the capacitor 13.

The battery protection device 110 includes a battery protection integrated circuit 120. The battery protection integrated circuit 120 is an example of a battery protection integrated circuit for protecting the secondary battery 200 from the overcurrent by controlling charge/discharge of the secondary battery 200 while it is powered by the secondary battery 200. The battery protection integrated circuit 120 protects the secondary battery 200 while being powered by the secondary battery 200.

For example, the battery protection integrated circuit 120 includes a power supply terminal 91, a ground terminal 92, a current detection terminal 95, a first source terminal 96, a second source terminal 97, a drain terminal 15 and a memory power supply terminal 14.

The power supply terminal 91 is a power supply terminal at positive electrode side connected to a cell connection terminal 3 or a power supply path 8 through a resistor 1, and it may be referred to as a VDD terminal. For example, the power supply terminal 91 is connected to a connection point between one end of the resistor 1 whereas the other end thereof is connected to the power supply path 8 and one end of a capacitor 2 whereas the other end thereof is connected to a power supply path 7. The other end of the capacitor 2 is connected to the power supply path 7 disposed between the cell connection terminal 4 and the transistor 12.

The ground terminal 92 is a power supply terminal at the negative electrode side connected to power supply path 7 disposed between the cell connection terminal 4 and the transistor 12, and it may be referred to as a VSS terminal.

The current detection terminal 95 is a terminal at which a voltage according to current flowing through the secondary battery 200 is provided, and it may be referred to as V− terminal. The current detection terminal 95 is connected to the power supply path 7 disposed between the load connection terminal 6 and the transistor 11 through the resistor 9.

The first source terminal 96 is a terminal connected to a source of the transistor 12 for controlling discharge in the battery protection integrated circuit 120, and it may be referred to as S1 terminal.

The second source terminal 97 is a terminal connected to a source of the transistor 11 for controlling charge in the battery protection integrated circuit 120, and it may be referred to as S2 terminal.

The drain terminal 15 is a terminal extended from a connection point of a drain of the transistor 11 and a drain of the transistor 12, and it may be referred to as D terminal. The drain terminal 15 is a test terminal in the battery protection integrated circuit 120.

The memory power supply terminal 14 is a terminal for inputting electric power of the memory 60, and it may be referred to as VPP terminal. A voltage for setting a mode for writing data into the memory 60 or a mode for retrieving data from the memory 60 in a selection test process for determining a specification of the battery protection integrated circuit 120 is input at the memory power supply terminal 14. The selection test process is a process among processes of manufacturing after the battery protection integrated circuit 120 is mounted on a substrate of the battery protection device 110 or before the battery protection integrated circuit 120 is mounted on a substrate of the battery protection device 110. After finishing the selection test process, as shown in FIG. 3, the memory power supply terminal 14 is connected with the same potential as the VSS terminal and the S1 terminal so as to prevent erroneous writing into the memory 60.

For example, the battery protection circuit 120 includes a memory 60, adjusting circuit 61 and a battery protection control circuit 98. The memory 60 is an example of a nonvolatile memory capable of having data written data therein with a writing voltage supplied at the memory power supply terminal 14. An OTPROM (One Time Programmable ROM), an EEPROM (Electrically Erasable Programmable ROM), etc., are exemplified as the memory 60.

Specification setting data for setting the specification of the battery protection integrated circuit 120 is exemplified as the data to be written into the memory 60. For example, the adjusting circuit 61 is a circuit including a setting circuit for setting the specification of the battery protection integrated circuit 120 to be a battery protection specification corresponding to the specification setting data retrieved from the memory 60. For example, the battery protection control circuit 98 is a protection operation circuit for controlling a protection operation of the secondary battery 200 according to the battery protection specification set corresponding to the specification setting data retrieved from the memory 60 by the adjusting circuit 61.

Therefore, the protection operation of the secondary battery can be changed by changing the specification setting data written in the memory 60, thereby using a common circuit configuration to discrete specifications. For example, hardware of the battery protection integrated circuit 120 can be used in common even if a type of the secondary battery 200 is different from one another or a product in which the battery protection integrated circuit is installed is different from one another.

Also, for example, change of metal lines arrangement in a IC chip or laser trimming of fuse for customizing the specification is not required since the battery protection integrated circuit 120 includes a memory 60 capable of having the specification setting data written therein. As a consequence, a lead time and a cost for development and manufacturing can be reduced.

For example, the specification setting data written in the memory 60 is data for setting detection specification of an abnormality detection circuit 21 described below.

For example, the specification setting data for setting the detection specification of the abnormality detection circuit 21 is threshold voltage setting data for setting an overcurrent detection voltage (threshold voltage for detecting the overcurrent) such as a discharge overcurrent detection voltage Vdet3 described below. For example, the adjusting circuit 61 can set a typical value (representative value) of the overcurrent detection voltage according to the threshold voltage setting data for setting the overcurrent detection voltage retrieved from the memory 60. Therefore, the typical value of the threshold voltage such as an overcurrent detection voltage can be changed with a common circuit configuration by changing the threshold voltage setting data written in the memory 60.

Also, for example, the specification setting data for setting the detection specification of the abnormality detection circuit 21 is delay time setting data for setting a delay time such as a discharge overcurrent detection delay time tVdet3 described below. For example, the adjusting circuit 61 can set a typical value (representative value) of a delay time according to the delay time setting data retrieved from the memory 60. Therefore, the typical value of the delay time can be changed with a common circuit configuration by changing the delay time setting data written in the memory 60.

For example, the data written in the memory 60 is characteristic adjusting data for absorbing individual difference of circuit characteristic of the battery protection integrated circuit 120. For example, the adjusting circuit 61 adjusts the circuit characteristic of the battery protection integrated circuit 120 by a fine adjustment according to the characteristic adjusting data retrieved from the memory 60.

For example, the characteristic adjusting data is data for absorbing individual difference of detection characteristic of the abnormality detection circuit 21 described below.

For example, the characteristic adjusting data for absorbing the individual difference of the detection characteristic of the abnormality detection circuit 21 is threshold voltage adjusting data for absorbing the individual difference of the overcurrent detection voltage such as a discharge overcurrent detection voltage Vdet3 described below. For example, the adjusting circuit 61 can finely adjust the typical value of the overcurrent detection voltage set according to the specification setting data retrieved from the memory 60 in accordance with the threshold voltage adjusting data for adjusting the overcurrent detection voltage retrieved from the memory 60.

Also, for example, the characteristic adjusting data is delay time adjusting data such as a discharge overcurrent detection delay time tVdet3 described below for absorbing the individual difference in the detection characteristic of the delay time of the abnormality detection circuit 21. For example, the adjusting circuit 61 can finely adjust the typical value of the delay time set according to the specification setting data retrieved from the memory 60 in accordance with the delay time adjusting data retrieved from the memory 60.

The battery protection control circuit 98 includes an abnormality detection circuit 21 for detecting an abnormality of the current or the voltage in the secondary battery 200 and a logic circuit 44 for turning on/off the transistor 11 and 12 based on the detection result of the abnormality detection circuit 21. For example, the abnormality detection circuit 21 includes an overcharge detection circuit 22, an over discharge detection circuit 27, a discharge overcurrent detection circuit 32, a charge overcurrent detection circuit 35 and a short-circuiting detection circuit 38.

For example, the battery protection control circuit 98 preforms an operation (overcharge protection operation) for protecting the secondary battery 200 from the overcharge. For example, the overcharge detection circuit 22 detects a voltage between the power supply terminal 91 and the ground terminal 92 by using resistors 23 and 24, thereby monitoring a battery voltage (cell voltage) of the secondary battery 200. The overcharge detection circuit 22 detects the overcharge of the secondary battery 200 to output an overcharge detection signal by detecting a cell voltage greater than or equal to the overcharge detection voltage Vdet1, where the overcharge detection voltage Vdet1 is set according to a threshold voltage setting data retrieved from the memory 60. The detection of the cell voltage greater than or equal to the overcharge detection voltage Vdet1 and output of the overcharge detection signal are achieved by a reference voltage 26 and a comparator 25.

Upon detecting the overcharge detection signal, the logic circuit 44 waits until a overcharge detection delay time tVdet1 passes, and preforms a overcharge protection operation in which a control signal at the low level for turning off the transistor 11 is output to the gate of the transistor 11, where the overcharge detection delay time tVdet1 is set according to delay time setting data retrieved from the memory 60. The overcharge of the secondary battery 200 can be prevented regardless of on/off state of the transistor 12 by turning off the transistor 11. The logic circuit 44 turns off the transistor 11 by turning off a transistor 46 and turning on a transistor 47.

For example, the battery protection control circuit 98 performs an operation (over discharge protection operation) for protecting the secondary battery 200 from the over discharge. For example, the over discharge detection circuit 27 detects a voltage between the power supply terminal 91 and the ground terminal 92 through resistors 28 and 29, thereby monitoring the battery voltage (cell voltage) of the secondary battery 200. The over discharge detection circuit 27 detects the over discharge of the secondary battery 200 to output an over discharge detection signal by detecting a cell voltage equal to or less than the over discharge detection voltage Vdet2, where the over discharge detection voltage Vdet2 is set according to a threshold voltage setting data retrieved from the memory 60. The detection of the cell voltage equal to or less than the over discharge detection voltage Vdet2 and output of the over discharge detection signal are achieved by a reference voltage 31 and a comparator 30.

Upon detecting the over discharge detection signal, the logic circuit 44 waits until an over discharge detection delay time tVdet2 passes, and preforms an over discharge protection operation in which a control signal at the low level for turning off the transistor 12 is output to the gate of the transistor 12, where the over discharge detection delay time tVdet2 is set according to delay time setting data retrieved from the memory 60. The over discharge of the secondary battery 200 can be prevented regardless of on/off state of the transistor 11 by turning off the transistor 12. The logic circuit 44 turns off the transistor 12 by turning off a transistor 48 and turning on a transistor 49.

For example, the battery protection control circuit 98 performs an operation (discharge overcurrent protection operation) for protecting the secondary battery 200 from the discharge overcurrent. For example, the discharge overcurrent detection circuit 32 detects a voltage between the current detection terminal 95 and the ground terminal 92, thereby monitoring a voltage P– between the load connection terminal 6 and the cell connection terminal 4. The discharge overcurrent detection circuit 32 detects the discharge overcurrent as abnormal current flowing through the load connection terminal 6 to output an discharge overcurrent detection signal by detecting a voltage P– greater than or equal to the discharge overcurrent detection voltage Vdet3, where the discharge overcurrent detection voltage Vdet3 is set according to the threshold voltage setting data retrieved from the memory 60. The detection of the voltage P– greater than or equal to the discharge overcurrent detection voltage Vdet3 and output of the discharge overcurrent detection signal are achieved by a reference voltage 34 and a comparator 33.

Upon detecting the discharge overcurrent detection signal, the logic circuit 44 waits until an discharge overcurrent detection delay time tVdet3 passes, and preforms an discharge overcurrent protection operation in which a control signal at the low level for turning off the transistor 12 is output to the gate of the transistor 12, where the discharge overcurrent detection delay time tVdet3 is set according to the delay time setting data retrieved from the memory 60. The discharge overcurrent flowing in the discharge direction of the secondary battery 200 can be prevented regardless of on/off state of the transistor 11 by turning off the transistor 12.

Here, the voltage P− is raised according to flow of discharge current for discharging the secondary battery 200 while the transistor 12 is turned on since the voltage is raised due to on-resistance of the transistor 12.

For example, the battery protection control circuit 98 performs an operation (charge overcurrent protection operation) for protecting the secondary battery 200 from the charge overcurrent. For example, the charge overcurrent detection circuit 35 detects a voltage between the current detection terminal 95 and the ground terminal 92, thereby monitoring a voltage P− between the load connection terminal 6 and the cell connection terminal 4. The charge overcurrent detection circuit 35 detects the charge overcurrent as abnormal current flowing through the load connection terminal 6 to output an charge overcurrent detection signal by detecting a voltage P− equal to or less than the charge overcurrent detection voltage Vdet4, where the charge overcurrent detection voltage Vdet4 is set according to the threshold voltage setting data retrieved from the memory 60. The detection of the voltage P− equal to or less than the charge overcurrent detection voltage Vdet4 and output of the charge overcurrent detection signal are achieved by a reference voltage 37 and a comparator 36.

Upon detecting the charge overcurrent detection signal, the logic circuit 44 waits until an charge overcurrent detection delay time tVdet4 passes, and preforms an charge overcurrent protection operation in which a control signal at the low level for turning off the transistor 11 is output to the gate of the transistor 11, where the charge overcurrent detection delay time tVdet4 is set according to the delay time setting data retrieved from the memory 60. The charge overcurrent flowing in the charge direction of the secondary battery 200 can be prevented regardless of on/off state of the transistor 12 by turning off the transistor 11.

Here, the voltage P− falls according to flow of charge current for charging the secondary battery 200 while the transistor 11 is turned on since the voltage falls due to on-resistance of the transistor 11.

For example, the battery protection control circuit 98 performs an operation (short-circuiting protection operation) for protecting the secondary battery 200 from the short-circuiting current. For example, the short-circuiting detection circuit 38 detects a voltage between the current detection terminal 95 and the ground terminal 92, thereby monitoring a voltage P− between the load connection terminal 6 and the cell connection terminal 4. The short-circuiting detection circuit 38 detects the short-circuiting between the load connection terminal 5 and the load connection terminal 6 to output a short-circuiting detection signal by detecting a voltage P− greater than or equal to the short-circuiting detection voltage Vshort, where the short-circuiting detection voltage Vshort is set according to the threshold voltage setting data retrieved from the memory 60. The detection of the voltage P− greater than or equal to the short-circuiting detection voltage Vshort and output of the short-circuiting detection signal are achieved by a reference voltage 40 and a comparator 39.

The short-circuiting detection signal is input to a delay circuit 41, then, after the short-circuiting delay time tshort passes, the short-circuiting detection signal is output from the delay circuit 41. The short-circuiting delay time tshort is set according to the delay time setting data retrieved from the memory 60.

Upon detecting the short-circuiting detection signal through the delay circuit 41, the logic circuit 44 preforms a short-circuiting protection operation in which a control signal at the low level for turning off the transistor 12 is output to the gate of the transistor 12. The short-circuiting current flowing in the discharge direction of the secondary battery 200 can be prevented regardless of on/off state of the transistor 11 by turning off the transistor 12.

The threshold voltage setting data for setting the threshold voltages such as an overcharge detection voltage Vdet1, an over discharge detection voltage Vdet2, a discharge overcurrent detection voltage Vdet3, a charge overcurrent detection voltage Vdet4, or a short-circuiting detection voltage Vshort is stored in the memory 60 in advance.

For example, the adjusting circuit 61 changes at least one of the resistances of the resistor 23 and the resistor 24 and the reference voltage 26 based on the threshold voltage setting data of the overcharge detection voltage Vdet1 retrieved from the memory 60. Thus, the adjusting circuit 61 can set the overcharge detection voltage Vdet1 to be a voltage defined by the threshold voltage setting data of the overcharge detection voltage Vdet1. Similarly, the over discharge detection voltage Vdet2, the discharge overcurrent detection voltage Vdet3, the charge overcurrent detection voltage Vdet4, and the short-circuiting detection voltage Vshort are set.

The delay time setting data for setting delay times such as an overcharge detection delay time tVdet1, an over discharge detection delay time tVdet2, a discharge overcurrent delay time tVdet3, a charge overcurrent detection delay time tVdet4, or a short-circuiting detection delay time tshort is stored in the memory 60 in advance.

For example, the adjusting circuit 61 selects the delay time generated by the counter 42 based on the delay time setting data of the overcharge detection delay time tVdet1 retrieved from the memory 60. Thus, the adjusting circuit 61 can set the overcharge detection delay time tVdet1 to be a value defined by the delay time setting data of the overcharge detection delay time tVdet1. Similarly, the over discharge detection delay time tVdet2, the discharge overcurrent delay time tVdet3, the charge overcurrent detection delay time tVdet4, or the short-circuiting detection delay time tshort are set.

For example, the counter 42 includes a circuit in which a plurality of flip-flops are connected in series, and the counter 42 can generate discrete delay times. The counter 42 operates in accordance with the clock signal from the oscillator 43.

The delay circuit 41 changes a time constant of a primary delay circuit included in the delay circuit 41 based on the delay time setting data of the short-circuiting detection delay time tshort retrieved from the memory 60. Thus, the delay circuit 41 can set the short-circuiting detection delay time tshort to be a value defined by the delay time setting data of the short-circuiting detection delay time tshort.

As described above, the battery protection integrated circuit 120 includes a current path 7a (a part of the power supply path 7), a pair of transistors 11 and 12, discharge overcurrent detection circuit 32, the charge overcurrent detection circuit 35, a logic circuit 44, the memory 60 and the adjusting circuit 61. For example, the battery protection integrated circuit 120 includes these elements within a package (for example, resin-sealing body).

The current path 7a is a charge/discharge path between the terminals of the first source terminal 96 and the second source terminal 97. The transistors 11 and 12 connected in series with each other are connected in series with the current path 7a to control current flowing through the secondary battery 200. The transistor 11 is an example of charge control transistor for controlling the current following in a charge direction of the secondary battery 200, while the transistor 12 is an example of the discharge control transistor for controlling the current flowing in a discharge direction of the secondary battery 200.

The discharge overcurrent detection circuit 32 monitors a first relation of magnitude (a relation indicating which one is greater among two voltages) between the voltage P– and the discharge overcurrent detection voltage Vdet3 set for detecting the overcurrent (discharge overcurrent) flowing in the discharge direction of the secondary battery 200 while the transistors 11 and 12 are turned on. The voltage P– is a voltage between the terminals of the first source terminal 96 and the second source terminal 97 (in other words, a voltage between the terminals of the load connection terminal 6 and the cell connection terminal 4). The discharge overcurrent detection circuit 32 detects the discharge overcurrent based on the monitoring result of the first relation of magnitude.

The charge overcurrent detection circuit 35 monitors a second relation of magnitude (a relation indicating which one is greater among two voltages) between the voltage P– and the charge overcurrent detection voltage Vdet4 set for detecting the overcurrent (charge overcurrent) flowing in the charge direction of the secondary battery 200 while the transistors 11 and 12 are turned on. The charge overcurrent detection circuit 35 detects the charge overcurrent based on the monitoring result of the second relation of magnitude.

The logic circuit 44 is an example circuit which turns off the transistor 12 upon the discharge overcurrent detection circuit 32 detecting that the first relation of magnitude is inverted, and turns off the transistor 11 upon the charge overcurrent detection circuit 35 detecting that the second relation of magnitude is inverted.

The adjusting circuit 61 adjusts the discharge overcurrent detection voltage Vdet3 in accordance with the threshold voltage adjusting data of the discharge overcurrent detection voltage Vdet3 retrieved from the memory 60, and adjusts the charge overcurrent detection voltage Vdet4 in accordance with the threshold voltage adjusting data of the charge overcurrent detection voltage Vdet4 retrieved from the memory 60.

In the following, examples of method for correcting the discharge overcurrent detection voltage Vdet3 and the charge overcurrent detection voltage Vdet4 are shown and descriptions thereof are given.

Figure 4:
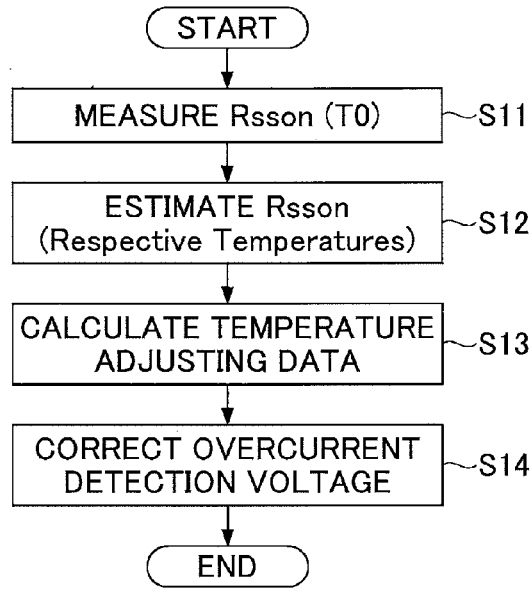
FIG. 4 is a flowchart for illustrating a first example of the method for correcting the charge overcurrent detection voltage.
Figure 5:
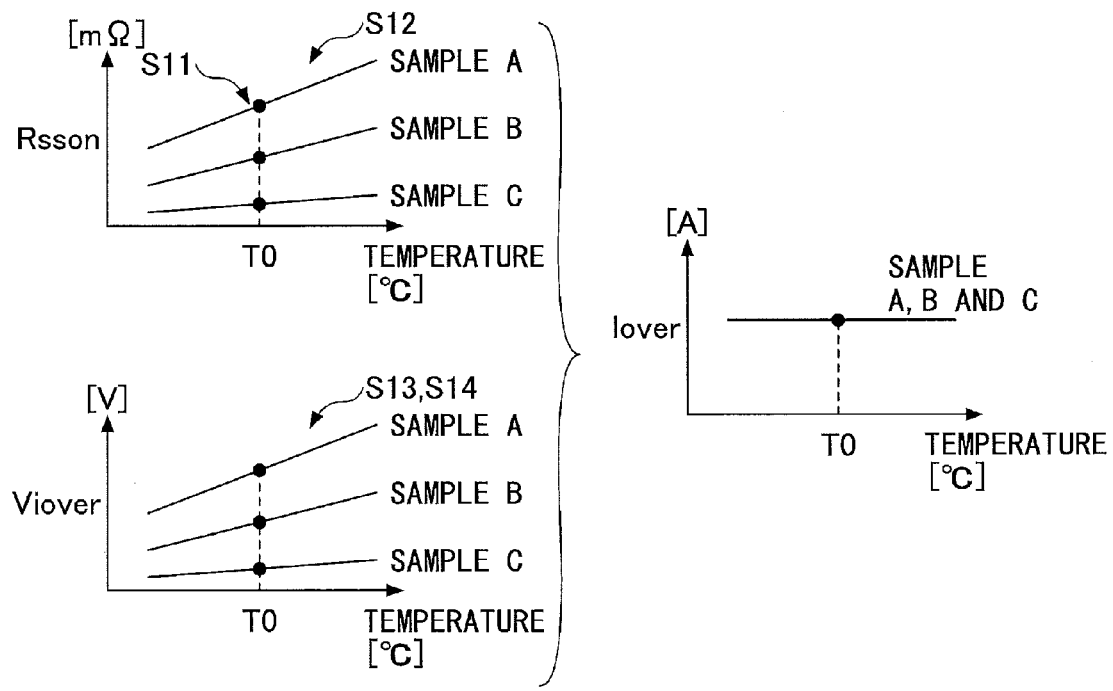
FIG. 5 is a diagram for illustrating operation and effect of the first example of the method for correcting the charge overcurrent detection voltage.

FIG. 4 is a flowchart for illustrating a first example of the method for correcting the overcurrent detection voltage of the battery protection integrated circuit 120. FIG. 4 shows an example flow of processing performed by an inspection apparatus which conducts a test on the battery protection integrated circuit 120 in the selection test for determining the specification of the battery protection integrated circuit 120. The inspection apparatus performs the present method on the respective battery protection integrated circuits 120. FIG. 5 is a diagram for illustrating operation and effect of the first example of the method for correcting the charge overcurrent detection voltage. In the following, the first example of the method for correcting the charge overcurrent detection voltage will be described with reference to FIG. 4 and FIG. 5.

In step S11, the inspection apparatus turns on the transistors 11 and 12 with the certain reference temperature T0 and the certain reference gate voltage Vgs0, thereby measuring Rsson of the transistors 11 and 12 at reference temperature T0 and the reference voltage Vgs0.

The Rsson of the transistors 11 and 12 means a sum of a value of the on-resistance of the transistor 11 and a value of the on-resistance of the transistor 12. The inspection apparatus can measure the Rsson of the transistors 11 and 12 by measuring the voltage between the first source terminal 96 to which the source of the transistor 12 is connected and the second source terminal 97 to which the source of the transistor 11 is connected.

The reference temperature T0 is set to be a predetermined value (for example, 25° C.), and the reference gate voltage Vgs0 is set to be a predetermined value (for example, 3.5 V). A gate voltage value indicates a voltage value between a gate and a source of a transistor (also referred to as VGS or gate voltage), and the reference gate voltage Vgs0 indicates a reference voltage value of VGS.

In step S12, the inspection apparatus calculates, by using the Rsson of the transistors 11 and 12 at the reference temperature T0 and the reference voltage Vgs0 measured in step S11, the Rsson of the transistors 11 and 12 at respective temperatures in accordance with the formula (1).

For example, the formula (1) is expressed as follows.

$$Ron(T)=Ron(T0)\times(1+\alpha\times(T-T0)) \quad (1)$$

Ron(T) indicates the Rsson of the transistors 11 and 12 at an arbitrary temperature, Ron(T0) indicates the Rsson measured in step S11, and $\alpha$ indicates an intrinsic constant defined according to types of the transistors 11 and 12. $\alpha$ may be a variable which becomes greater as the Ron(T0) becomes greater.

The inspection apparatus substitutes Ron(T0) measured in step S11 in the formula (1), thereby calculates the Rsson of the transistors 11 and 12 at the respective temperatures T1-TN as shown in FIG. 6. In FIG. 6, for example, Ron(T1) indicates the Rsson of the transistors 11 and 12 at a temperature T1, and Ron(TN) indicates the Rsson of the transistors 11 and 12 at a temperature TN. The inspection apparatus can estimate the Rsson of the transistors 11 and 12 at the respective temperatures T1-TN (other than temperature T0) without actually changing temperature by calculating the Rsson of the transistors 11 and 12 at the respective temperatures in accordance with the formula (1).

As described above, the inspection apparatus can estimate gradient data (see FIG. 5) with respect to variance of the Rsson due to temperature variance of the transistors 11 and 12 by calculating the Rsson of the transistors 11 and 12 at the respective temperatures T0-TN.

In step S12, for example, the inspection apparatus calculates the gradient data $\Delta Ron(T)$ shown in FIG. 7. $\Delta Ron(T)$ indicates differential value data between the Rsson of the transistors 11 and 12 at a temperature T and Ron(T0) measured in step S11.

In step S13, the inspection apparatus calculates adjusting data for canceling temperature dependency of the charge/discharge current of the secondary battery 200 by using Ron(T0) measured in step S11 and Ron(T1)-Ron(TN) estimated in step S12. For example, in step S13, the inspection apparatus calculates an overcurrent detection voltage Viover(T) for canceling the temperature dependency of an overcurrent detection value Iover at an arbitrary temperature, thereby finding temperature adjusting data for adjusting an overcurrent detection voltage Viover into the calculated overcurrent detection voltage Viover(T). The temperature adjusting data is an example of the threshold voltage adjusting data.

The inspection apparatus calculates the overcurrent detection voltage Viover(T) for canceling the temperature dependency of an overcurrent detection value Iover at an arbitrary temperature by using Ron(T0) measured in step S11 and Ron(T1)-Ron(TN) estimated in step S12. Specifically, the inspection apparatus calculates the overcurrent detection voltage Viover(T) so as to make the overcurrent detection value Iover closer to a current value without the temperature dependency by using, for example, the gradient data ΔRon(T) shown in FIG. 7.

Ron(T) at an arbitrary temperature T can be expressed by formula (2).

$$Ron(T)=Ron(T0)+\Delta Ron(T) \quad (2)$$

Therefore, the overcurrent detection voltage Viover(T) for making the overcurrent detection value Iover closer to a current value (for example, current value Ic) without the temperature dependency can be expressed by formula (3).

$$Viover(T)=Ron(T)\times Ic=(Ron(T0)+\Delta Ron(T))\times Ic=Ron(T0)\times Ic+\Delta Ron(T)\times Ic \quad (3)$$

That is, in step S13, the inspection apparatus calculates the temperature adjusting data for adjusting the overcurrent detection voltage Viover into the overcurrent detection voltage Viover(T) calculated in accordance with formula (3).

As described above, in step S13, the inspection apparatus calculates the overcurrent detection voltage Viover(T) for making a discharge overcurrent detection value closer to a current value without the temperature dependency, and calculates the temperature adjusting data D3a for adjusting the discharge overcurrent detection voltage Vdet3 into the calculated overcurrent detection voltage Viover(T). The discharge overcurrent detection value indicates a current value detected in the discharge overcurrent detection circuit 32. Similarly, in step S13, the inspection apparatus calculates the overcurrent detection voltage Viover(T) for making a charge overcurrent detection value closer to a current value without the temperature dependency, and calculates the temperature adjusting data D4a for adjusting the charge overcurrent detection voltage Vdet4 into the calculated overcurrent detection voltage Viover(T). The charge overcurrent detection value indicates a current value detected in the charge overcurrent detection circuit 35.

In step S14, the inspection apparatus corrects the discharge overcurrent detection voltage Vdet3 by using the temperature adjusting data D3a calculated in step S13. Thus, as shown in FIG. 5, the adjusting circuit 61 can adjust the discharge overcurrent detection voltage Vdet3 so as to become greater as the temperature T becomes greater, where the temperature T varies within a certain temperature range. Therefore, the discharge overcurrent detection value can be made closer to a current value without the temperature dependency. For example, in step S14, the inspection apparatus writes the temperature adjusting data D3a calculated in step S13 into the memory 60. Thus, the adjusting circuit 61 can retrieve the temperature adjusting data D3a from the memory 60 and adjust the discharge overcurrent detection voltage Vdet3.

Similarly, in step S14, the inspection apparatus corrects the charge overcurrent detection voltage Vdet4 by using the temperature adjusting data D4a calculated in step S13. Thus, as shown in FIG. 5, the adjusting circuit 61 can adjust the charge overcurrent detection voltage Vdet4 so as to become greater as the temperature T becomes greater, where the temperature T varies within a certain temperature range. Therefore, the charge overcurrent detection value can be made closer to a current value without the temperature dependency. For example, in step S14, the inspection apparatus writes the temperature adjusting data D4a calculated in step S13 into the memory 60. Thus, the adjusting circuit 61 can retrieve the temperature adjusting data D4a to adjust the charge overcurrent detection voltage Vdet4.

As described above, according to the present method, variation of the overcurrent detection values of the respective battery protection integrated circuits can be suppressed even if the Rsson is varied due to the manufacturing irregularity or the temperature variance, since the overcurrent detection voltage is corrected according to the temperature based on an actual measurement result of the Rsson.

Figure 8:
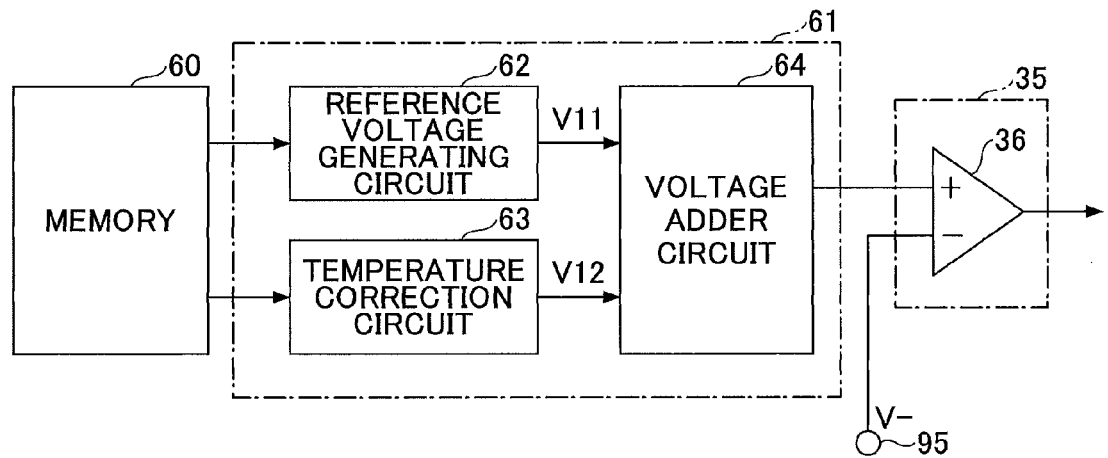
FIG. 8 is a diagram for illustrating a first example configuration of an adjusting circuit.

FIG. 8 is a diagram for illustrating a first example configuration of the adjusting circuit 61. The adjusting circuit 61 includes a reference voltage generating circuit 62, a temperature correction circuit 63 and a voltage adder circuit 64.

The reference voltage generating circuit 62 is a circuit for generating a certain voltage V11 according to the temperature adjusting data retrieved from the memory 60. The voltage V11 is a reference voltage corresponding to the first member "Ron(T0)×Ic" in right side of formula (3). That is, the voltage V11 is a constant value regardless of the temperature T. Additionally, the reference voltage generating circuit 62 may generate the voltage V11 as a voltage value built in the circuit without using the temperature adjusting data stored in the memory 60 in advance.

The temperature correction circuit 63 is a circuit for generating a voltage V12 according to the temperature adjusting data retrieved from the memory 60. The voltage V12 is a correction voltage corresponding to the second member "ΔRon(T)×Ic" in right side of formula (3). That is, the voltage V12 is a variable defined by the temperature T.

The voltage adder circuit 64 adds the voltage V11 and the voltage V12 to generate an overcurrent detection voltage which is varied in accordance with formula (3). That is, the voltage adder circuit 64 can set the charge overcurrent detection voltage Vdet4 of the charge overcurrent detection circuit 35 to be the overcurrent detection voltage which is varied in accordance with formula (3). Similarly, the voltage adder circuit 64 can set the discharge overcurrent detection voltage Vdet3 of the discharge overcurrent detection circuit 32 to be the overcurrent detection voltage which is varied in accordance with formula (3).

Figure 9:
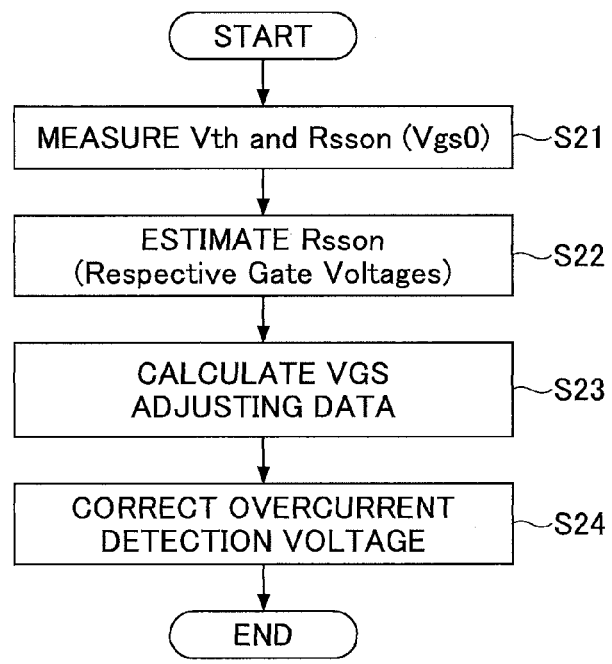
FIG. 9 is a flowchart for illustrating a second example of the method for correcting the charge overcurrent detection voltage.
Figure 10:
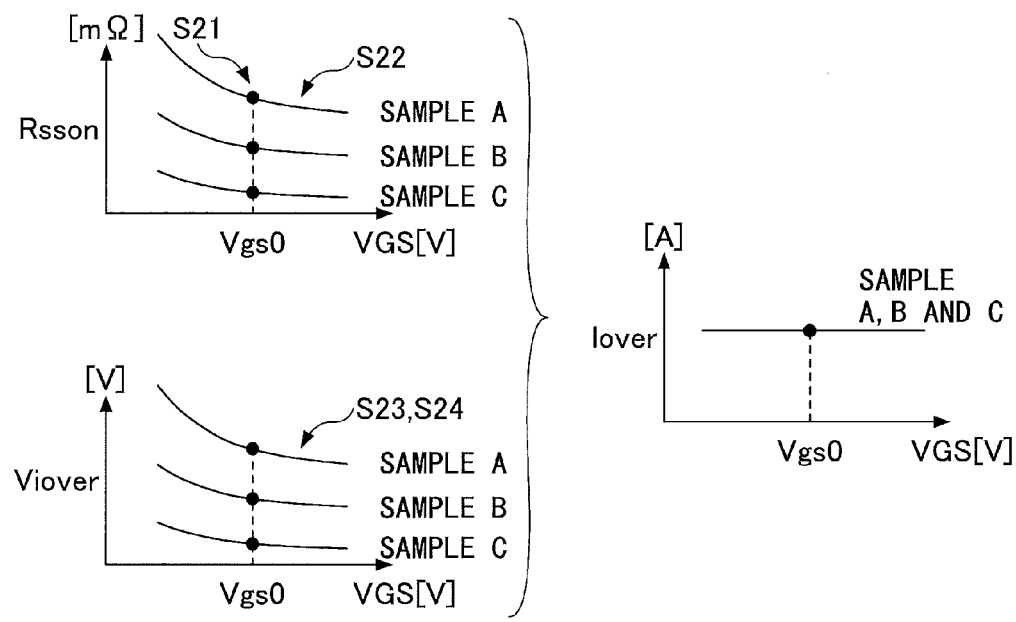
FIG. 10 is a diagram for illustrating operation and effect of the second example of the method for correcting the charge overcurrent detection voltage.

FIG. 9 is a flowchart for illustrating a second example of the method for correcting the overcurrent detection voltage of the battery protection integrated circuit 120. FIG. 9 shows an example flow of processing performed by an inspection apparatus which conducts a test on the battery protection integrated circuit 120 in the selection test for determining the specification of the battery protection integrated circuit 120. The inspection apparatus performs the present method on the respective battery protection integrated circuits 120. FIG. 10 is a diagram for illustrating operation and effect of the second example of the method for correcting the overcurrent detection voltage. In the following, the second example of the method for correcting the overcurrent detection voltage will be described with reference to FIG. 9 and FIG. 10. As for similar steps, etc., to the first example, the aforementioned descriptions are incorporated.

In step S21, the inspection apparatus measures the gate threshold voltage Vth of the transistors 11 and 12 and turns on the transistors 11 and 12 at the certain reference temperature T0 and the certain reference gate voltage Vgs0, thereby measuring Rsson (=Ron(Vgs0)) of the transistors 11 and 12 at the reference temperature T0 and the reference voltage Vgs0.

In step S22, the inspection apparatus calculates, by using the gate threshold voltage Vth at the temperature T0 measured in step S21, the Rsson of the transistors 11 and 12 at respective gate voltage values other than the gate reference voltage value Vgs0 in accordance with the formula (4).

For example, formula (4) is expressed as follows.

$$Ron(VGS)=A/(VGS-Vth)+C \quad (4)$$

Ron(VGS) indicates the Rsson of the transistors 11 and 12 at an arbitrary gate voltage VGS, Vth indicates gate threshold voltage measured in step S21, and A and C indicate constant values defined according to types of the transistors 11 and 12. A and C may be a variable which becomes smaller as Ron(Vgs0) becomes greater.

The inspection apparatus substitutes the Vth measured in step S21 in the formula (4), thereby calculates the Rsson of the transistors 11 and 12 at the respective gate voltage values Vgs1-VgsN as shown in FIG. 12. In FIG. 12, for example, Ron(Vgs1) indicates the Rsson of the transistors 11 and 12 at a gate voltage value Vgs1, and Ron(VgsN) indicates the Rsson of the transistors 11 and 12 at a gate voltage value VgsN. The inspection apparatus can estimate the Rsson of the transistors 11 and 12 at the respective gate voltage values Vgs1-VgsN (other than the reference gate voltage value Vgs0) without actually changing the gate voltage value by calculating the Rsson of the transistors 11 and 12 at the respective gate voltage values in accordance with the formula (4).

As described above, the inspection apparatus can estimate gradient data (see FIG. 10) with respect to variance of the Rsson of the transistors 11 and 12 due to VGS variance by calculating the Rsson of the transistors 11 and 12 at the respective gate voltage values Vgs1-VgsN.

In step S22, for example, the inspection apparatus calculates the gradient data ΔRon(VGS) shown in FIG. 13. ΔRon(VGS) indicates differential value data between the Rsson of the transistors 11 and 12 at a gate voltage VGS and Ron(Vgs0) measured in step S21.

In step S23, the inspection apparatus calculates adjusting data for canceling dependency of gate voltages of the transistor 11 and 12 of the charge/discharge current of the secondary battery 200 by using Ron(Vgs0) measured in step S21 and Ron(Vgs1)-Ron(VgsN) estimated in step S22. For example, in step S23, the inspection apparatus calculates an overcurrent detection voltage Viover(VGS) for canceling the gate voltage dependency of an overcurrent detection value Iover at an arbitrary gate voltage VGS, thereby finding VGS adjusting data for adjusting an overcurrent detection voltage Viover into the calculated overcurrent detection voltage Viover(VGS). The VGS adjusting data is an example of the threshold voltage adjusting data.

The inspection apparatus calculates the overcurrent detection voltage Viover(VGS) for canceling the gate voltage dependency of an overcurrent detection value Iover at an arbitrary gate voltage VGS by using Ron(Vgs0) measured in step S21 and Ron(Vgs1)-Ron(VgsN) estimated in step S22. Specifically, the inspection apparatus calculates the overcurrent detection voltage Viover(VGS) so as to make the overcurrent detection value Iover closer to a current value without the gate voltage dependency by using, for example, the gradient data ΔRon(VGS) shown in FIG. 13.

Ron(Vgs) at an arbitrary gate voltage VGS is expressed by formula (5).

$$Ron(VGS)=Ron(Vgs0)+\Delta Ron(VGS) \quad (5)$$

Therefore, the overcurrent detection voltage Viover(VGS) for making the overcurrent detection value Iover closer to a current value (for example, current value Ic) without the gate voltage dependency is expressed by formula (6).

$$Viover(VGS)=Ron(VGS) \times Ic=(Ron(Vgs0)+\Delta Ron(VGS)) \times Ic=Ron(Vgs0) \times Ic+\Delta Ron(VGS) \times Ic \quad (6)$$

That is, in step S23, the inspection apparatus calculates the VGS adjusting data for adjusting the overcurrent detection voltage Viover into the overcurrent detection voltage Viover(VGS) calculated in accordance with formula (6).

As described above, in step S23, the inspection apparatus calculates the overcurrent detection voltage Viover(VGS) for making a discharge overcurrent detection value closer to a current value without the gate voltage dependency, and calculates the VGS adjusting data D3b for adjusting the discharge overcurrent detection voltage Vdet3 into the calculated overcurrent detection voltage Viover(VGS). Similarly, in step S23, the inspection apparatus calculates the overcurrent detection voltage Viover(VGS) for making a charge overcurrent detection value closer to a current value without the gate voltage dependency, and calculates the VGS adjusting data D4b for adjusting the charge overcurrent detection voltage Vdet4 into the calculated overcurrent detection voltage Viover(VGS).

In step S24, the inspection apparatus corrects the discharge overcurrent detection voltage Vdet3 by using the VGS adjusting data D3b calculated in step S23. Thus, as shown in FIG. 10, the adjusting circuit 61 can adjust the discharge overcurrent detection voltage Vdet3 so as to become smaller as the gate voltage VGS becomes greater, where the gate voltage VGS varies within a certain voltage range. Therefore, the discharge overcurrent detection value can be made closer to a current value without the gate voltage dependency. For example, in step S24, the inspection apparatus writes the VGS adjusting data D3b calculated in step S23 into the memory 60. Thus, the adjusting circuit 61 can retrieve the VGS adjusting data D3b from the memory 60 and adjust the discharge overcurrent detection voltage Vdet3.

Similarly, in step S24, the inspection apparatus corrects the charge overcurrent detection voltage Vdet4 by using the VGS adjusting data D4b calculated in step S23. Thus, as shown in FIG. 10, the adjusting circuit 61 can adjust the charge overcurrent detection voltage Vdet4 so as to become smaller as the gate voltage VGS becomes greater, where the gate voltage VGS varies within a certain voltage range. Therefore, the charge overcurrent detection value can be made closer to a current value without the gate voltage dependency. For example, in step S24, the inspection apparatus writes the VGS adjusting data D4b calculated in step S23 into the memory 60. Thus, the adjusting circuit 61 can retrieve the VGS adjusting data D4b to adjust the charge overcurrent detection voltage Vdet4.

As described above, according to the present method, variation of the overcurrent detection values of the respective battery protection integrated circuits can be suppressed even if the Rsson is vary due to the manufacturing irregularity or the VGS variance, since the overcurrent detection voltage is corrected according to the VGS based on an actual measurement result of the Rsson.

Figure 11:
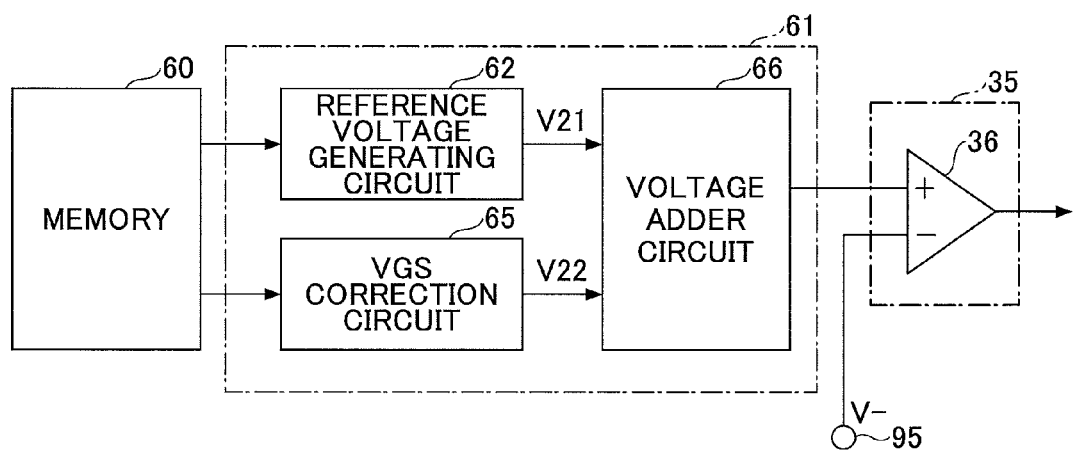
FIG. 11 is a diagram for illustrating a second example configuration of the adjusting circuit.

FIG. 11 is a diagram for illustrating a second example configuration of the adjusting circuit 61. The adjusting circuit 61 includes a reference voltage generating circuit 62, a VGS correction circuit 65 and a voltage adder circuit 66.

The reference voltage generating circuit 62 is a circuit for generating a certain voltage V21 according to the VGS adjusting data retrieved from the memory 60. The voltage V21 is a reference voltage corresponding to the first member "Ron(Vgs0)×Ic" in right side of formula (6). That is, the voltage V21 is a constant value regardless of the gate voltage VGS. Additionally, the reference voltage generating circuit 62 may generate the voltage V21 as a voltage value built in the circuit without using the VGS adjusting data stored in the memory 60 in advance.

The VGS correction circuit 65 is a circuit for generating a voltage V22 according to the VGS adjusting data retrieved from the memory 60. The voltage V22 is a correction voltage corresponding to the second member "ΔRon(VGS)×Ic" in right side of formula (6). That is, the voltage V22 is a variable defined by the gate voltage VGS.

The voltage adder circuit 66 adds the voltage V21 and the voltage V22 to generate an overcurrent detection voltage which is varied in accordance with formula (6). That is, the voltage adder circuit 66 can set the charge overcurrent detection voltage Vdet4 of the charge overcurrent detection circuit 35 to be the overcurrent detection voltage which is varied in accordance with formula (6). Similarly, the voltage adder circuit 66 can set the discharge overcurrent detection voltage Vdet3 of the discharge overcurrent detection circuit 32 to be the overcurrent detection voltage which is varied in accordance with formula (6).

Herein above, although the method for correcting the overcurrent detection voltage has been described with respect to specific embodiments, the appended claims are not to be thus limited. It should be understood that the various changes, substitutions, and alterations could be made hereto without departing from the spirit and scope of the claims. Further, all or part of the components of the embodiments described above can be combined.

For example, the first example of the method for correcting the overcurrent detection voltage shown in FIG. 4 and the second example of the method for correcting the overcurrent detection voltage shown in FIG. 9 may be combined. Specifically, both of the respective steps shown in FIG. 4 and the respective steps shown in FIG. 9 may be performed.

In this case, the Rsson(=Ron(T,VGS)) of the transistors 11 and 12 at an arbitrary temperature and an arbitrary gate voltage VGS is expressed by formula (7).

$$Ron(T,VGS)=Ron(T0,Vgs0)+\Delta Ron(T)+\Delta Ron(VGS) \quad (7)$$

Ron(T0,Vgs0) is equal to Ron(T) measured in step S11 or Ron(Vgs0) measured in step S21.

Therefore, the overcurrent detection voltage Viover(T, VGS) for making the overcurrent detection value Iover closer to a current value (for example, current value Ic) without the temperature dependency and the gate voltage dependency can be expressed by formula (8).

$$Viover(T,VGS)=Ron(T,VGS)\times Ic=(Ron(T0,Vgs0)+\Delta Ron(T)+\Delta Ron(VGS))\times Ic=Ron(T0,Vgs0)\times Ic+\Delta Ron(T)\times Ic+\Delta Ron(VGS)\times Ic \quad (8)$$

That is, in step S13 (S23), the inspection apparatus calculates the temperature adjusting data for adjusting the overcurrent detection voltage Viover into the overcurrent detection voltage Viover(T,VGS) calculated in accordance with formula (8). The following process is similar to that of the aforementioned embodiment, therefore, the aforementioned descriptions are incorporated.

Figure 14:
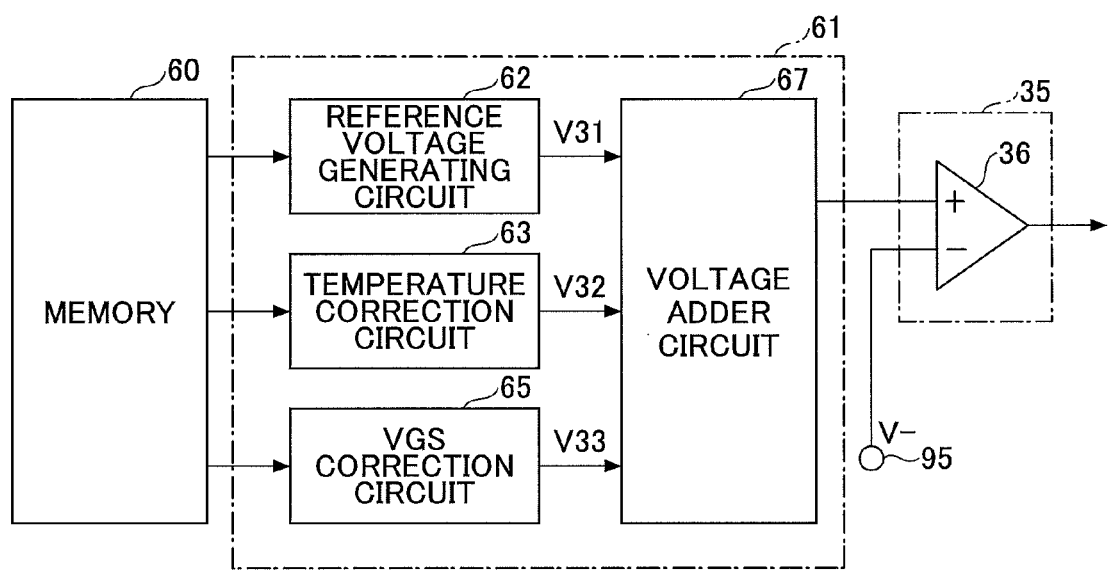
FIG. 14 is a diagram for illustrating a third example configuration of the adjusting circuit.

FIG. 14 is a diagram for illustrating a third example configuration of the adjusting circuit 61. The adjusting circuit 61 includes a reference voltage generating circuit 62, a temperature correction circuit 63, VGS correction circuit 65 and a voltage adder circuit 67.

The reference voltage generating circuit 62 is a circuit for generating a certain voltage V31 according to the threshold voltage adjusting data retrieved from the memory 60. The voltage V31 is a reference voltage corresponding to the first member "Ron(T0,Vgs0)×Ic" in right side of formula (8). That is, the voltage V31 is a constant value regardless of the temperature T. Additionally, the reference voltage generating circuit 62 may generate the voltage V31 as a voltage value built in the circuit without using the threshold voltage adjusting data stored in the memory 60 in advance.

The temperature correction circuit 63 is a circuit for generating a voltage V32 according to the threshold voltage adjusting data retrieved from the memory 60. The voltage V32 is a correction voltage corresponding to the second member "ΔRon(T)×Ic" in right side of formula (8). That is, the voltage V32 is a variable defined by the temperature T.

The VGS correction circuit 65 is a circuit for generating a voltage V33 according to the threshold voltage adjusting data retrieved from the memory 60. The voltage V33 is a correction voltage corresponding to the third member "ΔRon(VGS)×Ic" in right side of formula (8). That is, the voltage V33 is a variable defined by the gate voltage VGS.

The voltage adder circuit 67 adds the voltage V31, the voltage V32 and the voltage V33 to generate an overcurrent detection voltage which is varied in accordance with formula (8). That is, the voltage adder circuit 67 can set the charge overcurrent detection voltage Vdet4 of the charge overcurrent detection circuit 35 to be the overcurrent detection voltage which is varied in accordance with formula (8). Similarly, the voltage adder circuit 67 can set the discharge overcurrent detection voltage Vdet3 of the discharge overcurrent detection circuit 32 to be the overcurrent detection voltage which is varied in accordance with formula (8).

Also, in the method for correcting the charge overcurrent detection voltage, in a case where the memory 60 is not included, the inspection apparatus may correct the overcurrent detection voltage in step S14 or S24 based on the adjusting data calculated in step S13 or S23 by laser trimming, etc.

What is claimed is:

1. A method of correcting an overcurrent detection voltage of a battery protection integrated circuit including
   a current path between a first terminal and a second terminal,
   one or more transistors connected in series in the current path for controlling current of a secondary battery,
   an overcurrent detection circuit configured to monitor a relation of magnitude between a current path voltage and an overcurrent detection voltage set for detecting overcurrent of the secondary battery, the current path voltage being a voltage between the first terminal and the second terminal during an on state of the one or more transistors, and
   a control circuit configured to turn off the one or more transistors upon the overcurrent detection circuit detecting that the relation of magnitude is inverted,
   the method comprising the steps of:
   measuring a resistance value between the first terminal and the second terminal while the one or more transistors are turned on at a predetermined temperature;

estimating resistance values between the first terminal and the second terminal at respective temperatures based on the measured resistance value;

calculating adjusting data for canceling temperature dependency of charge or discharge current of the secondary battery based on the measured resistance value and the estimated resistance values, wherein a value of the charge or discharge current varies depending on temperature;

correcting the overcurrent detection voltage based on the calculated adjusting data.

2. The method as claimed in claim 1, wherein the battery protection integrated circuit further includes a nonvolatile memory and a adjusting circuit configured to adjust the overcurrent detection voltage based on data retrieved from the memory, and in the step of correcting, the calculated adjusting data is written in the nonvolatile memory so that the written data can be retrieved.

3. The method as claimed in claim 1, wherein the one or more transistors include a charge control transistor configured to control the current flowing in a charge direction of the secondary battery and a discharge control transistor configured to control the current flowing in a discharge direction of the secondary battery, the charge transistor and the discharge transistor being connected in series, the overcurrent detection circuit includes a discharge overcurrent detection circuit configured to monitor a first relation of magnitude between the current path voltage and the overcurrent detection voltage, wherein the current path voltage is a voltage between the first terminal and the second terminal during an on state of the charge transistor and the discharge transistor and the overcurrent detection voltage is set for detecting overcurrent flowing in the discharge direction of the secondary battery, and a charge overcurrent detection circuit configured to monitor a second relation of magnitude between the current path voltage and the overcurrent detection voltage, wherein the current path voltage is a voltage between the first terminal and the second terminal during an on state of the charge transistor and the discharge transistor and the overcurrent detection voltage is set for detecting overcurrent flowing in the charge direction of the secondary battery, the control circuit turns off the discharge control transistor upon the discharge overcurrent detection circuit detecting that the first relation of magnitude is inverted and turns off the charge control transistor upon the charge overcurrent detection circuit detecting that the second relation of magnitude is inverted, and the control circuit corrects the discharge overcurrent detection voltage and the charge overcurrent detection voltage.

4. A method of correcting an overcurrent detection voltage of a battery protection integrated circuit including a current path between a first terminal and a second terminal, one or more transistors connected in series in the current path for controlling current of a secondary battery, an overcurrent detection circuit configured to monitor a relation of magnitude between a current path voltage and an overcurrent detection voltage set for detecting overcurrent of the secondary battery, the current path voltage being a voltage between the first terminal and the second terminal during an on state of the one or more transistors, and a control circuit configured to turn off the one or more transistors upon the overcurrent detection circuit detecting that the relation of magnitude is inverted, the method comprising the steps of:

measuring a gate threshold voltage of the one or more transistors at a predetermined temperature and a resistance value between the first terminal and the second terminal while the one or more transistors are turned on at a predetermined gate voltage;

estimating resistance values between the first terminal and the second terminal at respective gate voltages based on the measured gate threshold voltage;

calculating adjusting data for canceling gate voltage dependency of charge or discharge current of the secondary battery based on the measured resistance value and the estimated resistance values, wherein a value of the charge or discharge current varies depending on a gate voltage of the one or more transistors;

correcting the overcurrent detection voltage based on the calculated adjusting data.

5. The method as claimed in claim 4, wherein the battery protection integrated circuit further includes a nonvolatile memory and a adjusting circuit configured to adjust the overcurrent detection voltage based on data retrieved from the memory, and in the step of correcting, the calculated adjusting data is written in the nonvolatile memory so that the written data can be retrieved.

6. The method as claimed in claim 4, wherein the one or more transistors include a charge control transistor configured to control the current flowing in a charge direction of the secondary battery and a discharge control transistor configured to control the current flowing in a discharge direction of the secondary battery, the charge transistor and the discharge transistor being connected in series, the overcurrent detection circuit includes a discharge overcurrent detection circuit configured to monitor a first relation of magnitude between the current path voltage and the overcurrent detection voltage, wherein the current path voltage is a voltage between the first terminal and the second terminal during an on state of the charge transistor and the discharge transistor and the overcurrent detection voltage is set for detecting overcurrent flowing in the discharge direction of the secondary battery, and a charge overcurrent detection circuit configured to monitor a second relation of magnitude between the current path voltage and the overcurrent detection voltage, wherein the current path voltage is a voltage between the first terminal and the second terminal during an on state of the charge transistor and the discharge transistor and the overcurrent detection voltage is set for detecting overcurrent flowing in the charge direction of the secondary battery, the control circuit turns off the discharge control transistor upon the discharge overcurrent detection circuit detecting that the first relation of magnitude is inverted and turns off the charge control transistor upon the charge overcurrent detection circuit detecting that the second relation of magnitude is inverted, and the control circuit corrects the discharge overcurrent detection voltage and the charge overcurrent detection voltage.

7. A battery protection integrated circuit comprising:

a current path between a first terminal and a second terminal, one or more transistors connected in series in the current path for controlling current of a secondary battery, an overcurrent detection circuit configured to monitor a relation of magnitude between a current path voltage and an overcurrent detection voltage set for detecting overcurrent of the secondary battery, the current path voltage being a voltage between the first terminal and the second terminal during an on state of the one or more transistors, a control circuit configured to turn off the one or more transistors upon the overcurrent detection circuit detecting that the relation of magnitude is inverted, a nonvolatile memory in which adjusting data is written, the adjusting data being data for correcting individual difference of the on-resistance of the one or more transistors, and an adjusting circuit configured to adjust the overcurrent detection voltage in accordance with the adjusting data retrieved from the memory.

8. The battery protection integrated circuit as claimed in claim 7 wherein the adjusting circuit includes a voltage generating circuit configured to generate a reference voltage, a correction circuit configured to correct a correction voltage so as to vary depending on temperature or a gate voltage value of the one or more transistors based on the adjusting data retrieved from the nonvolatile memory, and an adder circuit configured to set the overcurrent detection voltage by adding the reference voltage and the correction voltage.

9. The battery protection integrated circuit as claimed in claim 7 wherein the adjusting data is further used for correcting at least one of temperature dependency of an on-resistance of the one or more transistors and gate voltage dependency of the on-resistance of the one or more transistors, the on-resistance of the one or more transistors varying depending on temperature and a gate voltage of the one or more transistors.

\* \* \* \* \*